United States Patent
Herbert (10) Patent No.: US 9,717,264 B2
(45) Date of Patent: Aug. 1, 2017

(54) INDIVIDUAL FROZEN DRINK DISPENSER

(71) Applicant: ISLAND OASIS FROZEN COCKTAIL CO., INC., Walpole, MA (US)

(72) Inventor: John Michael Herbert, Winchester, MA (US)

(73) Assignee: Island Oasis Frozen Cocktail Co., Inc., Walpole, MA (US)

( * ) Notice: Subject to any disclaimer, the term of this patent is extended or adjusted under 35 U.S.C. 154(b) by 210 days.

(21) Appl. No.: 14/541,909

(22) Filed: Nov. 14, 2014

(65) Prior Publication Data

US 2015/0071025 A1    Mar. 12, 2015

Related U.S. Application Data

(63) Continuation of application No. 14/349,413, filed as application No. PCT/US2012/058642 on Oct. 4, 2012.

(Continued)

(51) Int. Cl.
*A23G 9/28* (2006.01)
*A23G 9/12* (2006.01)
(Continued)

(52) U.S. Cl.
CPC ............... *A23G 9/28* (2013.01); *A23G 9/045* (2013.01); *A23G 9/12* (2013.01); *A23G 9/224* (2013.01);
(Continued)

(58) Field of Classification Search
CPC .. A47J 31/407; A47J 31/3633; A47J 31/3623; A47J 43/07; A47J 31/00;
(Continued)

(56) References Cited

U.S. PATENT DOCUMENTS 3,209,676 A    10/1965    Zimmermann et al.
3,213,777 A    10/1965    Heier
(Continued)

FOREIGN PATENT DOCUMENTS

WO    WO 2004/009486 A2    1/2004
WO    WO 2004/067386 A2    8/2004

OTHER PUBLICATIONS

International Search Report and Written Opinion for Application No. PCT/US2012/058642 mailed Jan. 4, 2013.
(Continued)

*Primary Examiner* — Tony G Soohoo
(74) *Attorney, Agent, or Firm* — Sughrue Mion, PLLC (57) ABSTRACT

An individual frozen drink dispenser includes a housing having a base configured to support a blender cup, a pod support disposed above the blender cup and configured to support a pod containing frozen ingredients suitable for preparing a frozen drink, a dispense plunger coupled to the housing and configured to move from a pre-dispense position to a dispense position in which the dispense plunger pushes the frozen ingredients from the pod into the blender cup, and a drive mechanism coupled to the housing and configured to drive the movement of the dispense plunger from the pre-dispense position to the dispense position. A method of preparing a frozen drink is further disclosed.

19 Claims, 8 Drawing Sheets

Related U.S. Application Data (60) Provisional application No. 61/543,588, filed on Oct. 5, 2011.

(51) Int. Cl.
| | | |
|---|---|---|
| *A23G 9/22* | (2006.01) | |
| *A23G 9/04* | (2006.01) | |
| *B01F 9/00* | (2006.01) | |
| *B01F 15/02* | (2006.01) | |
| *A47J 31/00* | (2006.01) | |

(52) U.S. Cl.
CPC ............ *A47J 31/00* (2013.01); *B01F 9/0032* (2013.01); *B01F 15/0205* (2013.01)

(58) Field of Classification Search
CPC ...... B01F 9/0032; B01F 15/0205; A23G 9/28; A23G 9/12; A23G 9/224; A23G 9/045
See application file for complete search history.

(56) References Cited

U.S. PATENT DOCUMENTS

| | | | |
|---|---|---|---|
| 3,295,998 A | | 1/1967 | Goros |
| 3,384,004 A | | 5/1968 | Perlman et al. |
| 3,647,472 A | | 3/1972 | Speech et al. |
| 3,812,273 A | | 5/1974 | Schmidt |
| 3,888,859 A | | 6/1975 | Ponzoni et al. |
| 3,939,667 A | | 2/1976 | Halverson |
| 4,163,510 A | | 8/1979 | Strenger |
| 4,237,911 A | | 12/1980 | White |
| 4,389,925 A | * | 6/1983 | Piana .................. A47J 31/0668 99/289 R |
| 4,467,943 A | | 8/1984 | Carse |
| 4,528,824 A | * | 7/1985 | Herbert .................. A23G 9/045 62/331 |
| 4,681,030 A | | 7/1987 | Herbert |
| 4,688,478 A | * | 8/1987 | Williams ................ A47J 43/06 241/282.1 |
| 4,745,773 A | * | 5/1988 | Ando ..................... A23G 9/045 241/DIG. 17 |
| D310,932 S | * | 10/1990 | Mitsubayashi ................ D7/378 |
| 5,305,923 A | * | 4/1994 | Kirschner ............. B67D 1/0021 222/129.1 |
| 5,323,691 A | * | 6/1994 | Reese ..................... A23G 9/045 99/275 |
| 5,619,901 A | | 4/1997 | Reese et al. |
| 6,182,862 B1 | | 2/2001 | McGill |
| 6,264,066 B1 | * | 7/2001 | Vincent .................. A23G 9/228 222/105 |
| 6,342,260 B2 | * | 1/2002 | Kolar .............................. 222/77 |
| 6,474,862 B2 | | 11/2002 | Farrell |
| 6,772,675 B2 | * | 8/2004 | Ervin ..................... A23G 9/045 241/101.2 |
| 7,231,142 B1 | | 6/2007 | Leung et al. |
| 8,291,812 B2 | | 10/2012 | Rivera |
| 8,685,477 B2 | | 4/2014 | Almblad et al. |
| 8,807,823 B2 | * | 8/2014 | Williams ................ B01F 7/161 366/197 |
| 8,960,999 B1 | * | 2/2015 | Ochoa .................... A47J 43/044 366/207 |
| 2002/0044997 A1 | * | 4/2002 | Farrell ..................... A23G 9/045 426/565 |
| 2002/0048626 A1 | | 4/2002 | Miller et al. |
| 2005/0170054 A1 | | 8/2005 | Czark et al. |
| 2008/0282722 A1 | | 11/2008 | Edmonds et al. |
| 2009/0186141 A1 | | 7/2009 | Almblad et al. |
| 2013/0064034 A1 | | 3/2013 | Almblad et al. |
| 2014/0291426 A1 | * | 10/2014 | Herbert ................ B67D 1/0004 241/25 |
| 2015/0296860 A1 | | 10/2015 | DesJardin et al. |
| 2015/0374025 A1 | * | 12/2015 | Evans .................... B65D 77/04 99/495 |
| 2016/0095461 A1 | * | 4/2016 | Desjardin ............... A47J 19/02 99/513 |

OTHER PUBLICATIONS

International Preliminary Report on Patentability for Application No. PCT/US2012/058642 mailed Apr. 17, 2014.

Notification of Transmittal of the International Search Report and the Written Opinion of the International Searching Authority from corresponding PCT/US2012/058642 mailed Jan. 4, 2013.

* cited by examiner

INDIVIDUAL FROZEN DRINK DISPENSER

RELATED APPLICATIONS

This patent application is a continuation-in-part of U.S. patent application Ser. No. 14/349,413, filed Oct. 4, 2012, entitled INDIVIDUAL FROZEN DRINK DISPENSER, which is currently pending and claims priority to PCT Application No. PCT/US2012/058642, filed Oct. 4, 2012, entitled INDIVIDUAL FROZEN DRINK DISPENSER [now Expired], which claims priority to U.S. Provisional Patent Application Ser. No. 61/543,588, entitled INDIVIDUAL FROZEN DRINK DISPENSER, filed on Oct. 5, 2011, all of which are incorporated herein by reference for all purposes.

BACKGROUND OF THE INVENTION

1. Field of the Invention

This invention relates generally to beverage dispensers, and more particularly to a single serve frozen drink beverage dispenser capable of preparing a frozen beverage using a disposable cartridge containing frozen ingredients.

2. Description of the Prior Art

Single serve drink dispensers are known in the art for dispensing hot drinks, such as coffee and tea, and for dispensing cold drinks, such as carbonated beverages. However such dispensers are incapable of dispensing blended ice, frozen drinks, such as smoothies and the like.

There exists a need, therefore, for a dispenser that is designed to dispense frozen treats that has a relatively simple and inexpensive operating mechanism, with the capability of presenting a cartridge receptacle that is configured to receive a frozen cartridge containing the ingredients for the frozen treat, all within a sanitized environment.

SUMMARY OF THE INVENTION

One aspect of the present disclosure is directed to an individual frozen drink dispenser comprising: a bottom shelf configured to support a blender cup, the bottom shelf including a blender drive to drive the operation of blades provided in the blender cup; a dispensing chamber including a cartridge receptacle configured to receive a frozen beverage cartridge, and a dispense plunger; a water reservoir including a water pump to drive the movement of water from the water reservoir to the dispense plunger of the dispensing chamber and into the blender cup; and a controller coupled to the blender drive, the dispense plunger, and the water pump to control the operation of the individual frozen drink dispenser.

Embodiments of the individual frozen drink dispenser may further include a meshed or serrated disc to separate frozen ingredients from the beverage cartridge into the blender cup. The dispense plunger may be configured to move from a pre-dispense position to a dispense position in which the dispense plunger pushes frozen ingredients from the beverage cartridge into the blender cup. The individual frozen drink dispenser may further comprise a dispense plunger drive motor to drive the movement of the dispense plunger from the pre-dispense position to the dispense position and a control panel coupled to the controller. The dispensing chamber may further include a water inlet coupled to the water reservoir and provided in the dispense plunger.

Another aspect of the present disclosure is directed to an individual frozen drink dispenser as shown and described.

Yet another aspect of the present disclosure is directed to a method of preparing a frozen drink as shown and describe.

Another aspect of the present disclosure is directed to an individual frozen drink dispenser includes a bottom shelf configured to support a blender cup. The bottom shelf has a blender drive to drive the operation of blades provided in the blender cup. The individual frozen drink dispenser further includes a dispensing chamber disposed above the bottom shelf. The dispensing chamber has a cartridge receptacle configured to receive a frozen beverage cartridge, a meshed or serrated disc disposed at a bottom of the cartridge receptacle, and a dispense plunger movable within the cartridge receptacle.

Embodiments of the individual frozen drink dispenser further include a controller coupled to the blender drive, the dispense plunger, and the water pump to control the operation of the individual frozen drink dispenser. The individual frozen drink dispenser further may include a control panel coupled to the controller. The dispense plunger may be configured to move from a pre-dispense position to a dispense position in which the dispense plunger pushes frozen ingredients from the beverage cartridge, through the meshed or serrated disk, and into the blender cup. The individual frozen drink dispenser further may include a dispense plunger drive motor to drive the movement of the dispense plunger from the pre-dispense position to the dispense position. The individual frozen drink dispenser further may include a water reservoir having a water pump to drive the movement of water from the water reservoir to the dispense plunger of the dispensing chamber and into the blender cup. The dispensing chamber further may include a water inlet coupled to the water reservoir and provided in the dispense plunger.

Another aspect of the disclosure is directed to a method of dispensing a frozen drink comprising: inserting a frozen beverage cartridge into a cartridge receptacle of an individual frozen drink dispenser; pushing contents of the frozen beverage cartridge through a meshed or serrated disc positioned at a bottom of the cartridge receptacle; dispensing the contents of the frozen beverage cartridge from the meshed or serrated disc into a blender cup; and blending the contents of the frozen beverage cartridge in the blender cup with blades provided in the blender cup. In one embodiment, the method further may comprise injecting fluid from a water reservoir into the cartridge receptacle when pushing contents of the frozen cartridge.

Another aspect of the disclosure is directed to an individual frozen drink dispenser comprising a housing having a base configured to support a blender cup, a pod support disposed above the blender cup and configured to support a pod containing frozen ingredients suitable for preparing a frozen drink, a dispense plunger coupled to the housing and configured to move from a pre-dispense position to a dispense position in which the dispense plunger pushes the frozen ingredients from the pod into the blender cup, and a drive mechanism coupled to the housing and configured to drive the movement of the dispense plunger from the pre-dispense position to the dispense position.

Embodiments of the dispenser further may include a water reservoir provided within the housing and a water line in fluid communication with the water reservoir and an opening of the blender cup. The dispenser further may include a water pump in fluid communication with the water line to drive the movement of water from the water reservoir to the dispense plunger and into the blender cup. The dispenser further may include a blender assembly to blend ingredients within the blender cup. The blender assembly may include a blender drive disposed within the base to drive the operation of blades provided in the blender cup. The blender assembly further may include a motor supported by the drive mechanism. The blender assembly further may include a rotatable shaft connected at one end thereof to the motor and blades mounted on the shaft at an opposite end of the shaft. The shaft of the blender assembly may extend through the dispense plunger to blend ingredients contained within the blender cup. The pod support may be configured to rest on the blender cup. The pod support may include a lower surface configured to seat the pod support on an upper edge of the blender cup and an upper surface having a recess formed therein, with the recess being sized to receive the pod within the recess after removing the seals from the pod. The dispenser further may include a controller coupled to the drive mechanism and configured to control the operation of the individual frozen drink dispenser.

Another aspect of the disclosure is directed to a method of dispensing a frozen drink. In one embodiment, the method comprises: placing the blender cup on a base of an individual frozen drink dispenser; placing a pod on a pod support disposed above the blender cup, the pod containing frozen ingredients suitable for preparing a frozen drink; pushing the ingredients of the pod into the blender cup; and blending the contents of the frozen beverage cartridge in the blender cup.

Embodiments of the method further may include injecting fluid from a water reservoir into the blender cup, removing the blender cup from the base of the dispenser, and removing the pod support from the blender cup. Pushing the ingredients of the pod into the blender cup may be achieved by a plunger. The plunger may be coupled to a drive mechanism of the dispenser, with the drive mechanism being configured to lower the plunger into the blender cup. Blending the contents may be achieved with blades provided in the blender cup. In another embodiment, blending the contents may be achieved with a blade assembly coupled to a drive mechanism of the dispenser, with the blade assembly being lowered by the drive mechanism into the blender cup.

These and other features and advantages of the present disclosure will now be described in greater detail with reference to the accompanying drawings, detailed description and claims.

DETAILED DESCRIPTION OF PREFERRED EMBODIMENTS

For the purposes of illustration only, and not to limit the generality, the present invention will now be described in detail with reference to the accompanying figures. This invention is not limited in its application to the details of construction and the arrangement of components set forth in the following description or illustrated in the drawings. The invention is capable of other embodiments and of being practiced or being carried out in various ways. Also the phraseology and terminology used herein is for the purpose of description and should not be regarded as limiting. The use of "including," "comprising," "having," "containing" "involving," and variations thereof herein, is meant to encompass the items listed thereafter and equivalents thereof as well as additional items.

Figure 1:
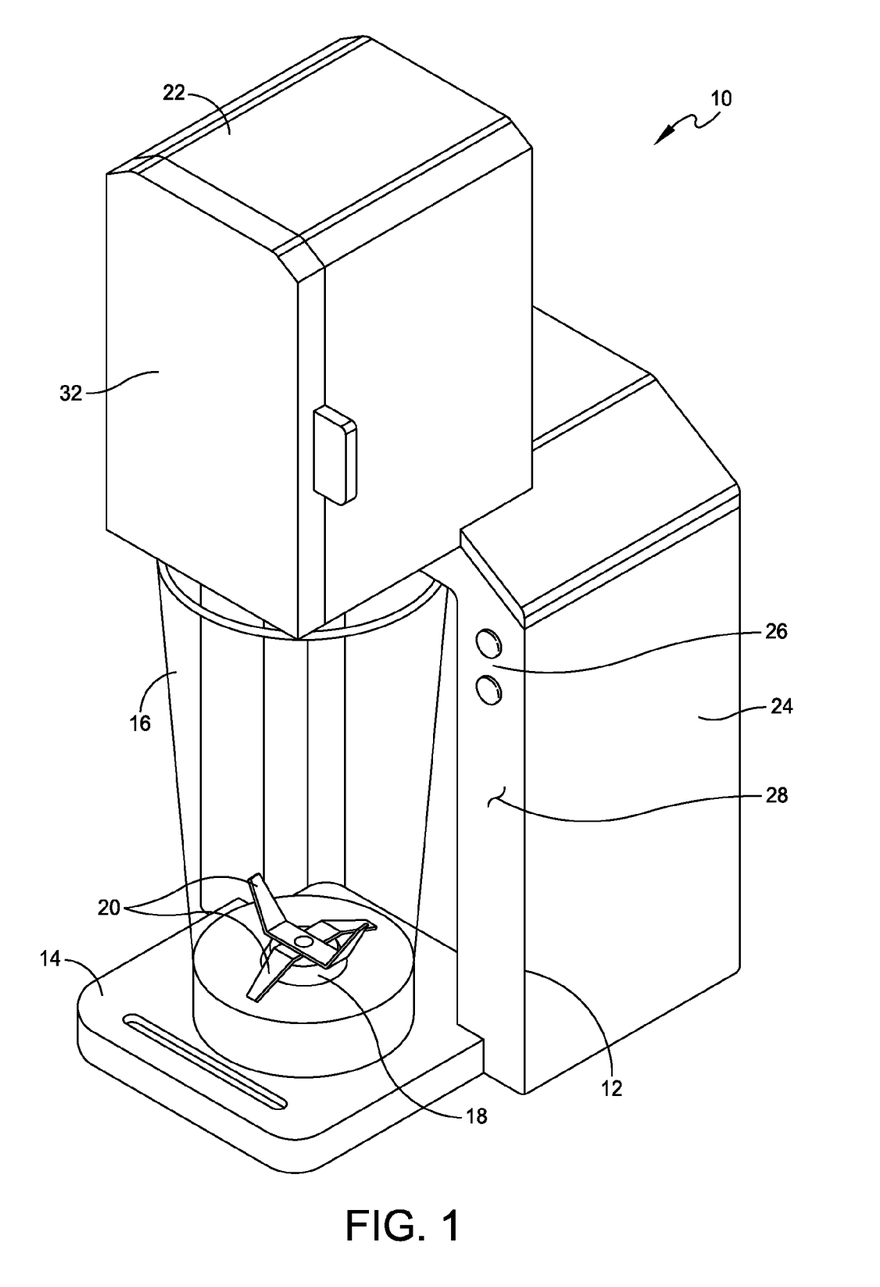
FIG. 1 is a perspective view of an individual frozen drink dispenser of an embodiment of the present disclosure.

Referring to the drawings, and more particularly to FIG. 1, there is generally indicated at 10 a single serve or individual frozen drink dispenser. The dispenser 10 includes a housing 12 with a forwardly protruding bottom shelf 14 arranged to support a blender cup 16 for the dispensed frozen beverage. A blender drive 18 is provided on the bottom shelf 14 to drive the operation of blades 20 provided in the blender cup 16. The housing 12 further includes a dispensing chamber 22 positioned above the bottom shelf 14. The housing 12 further includes a water reservoir 24 positioned at the rear of the housing and an electronic control panel 26 provided on a front surface 28 of the housing to control the operation of the dispenser 10.

Figure 2:
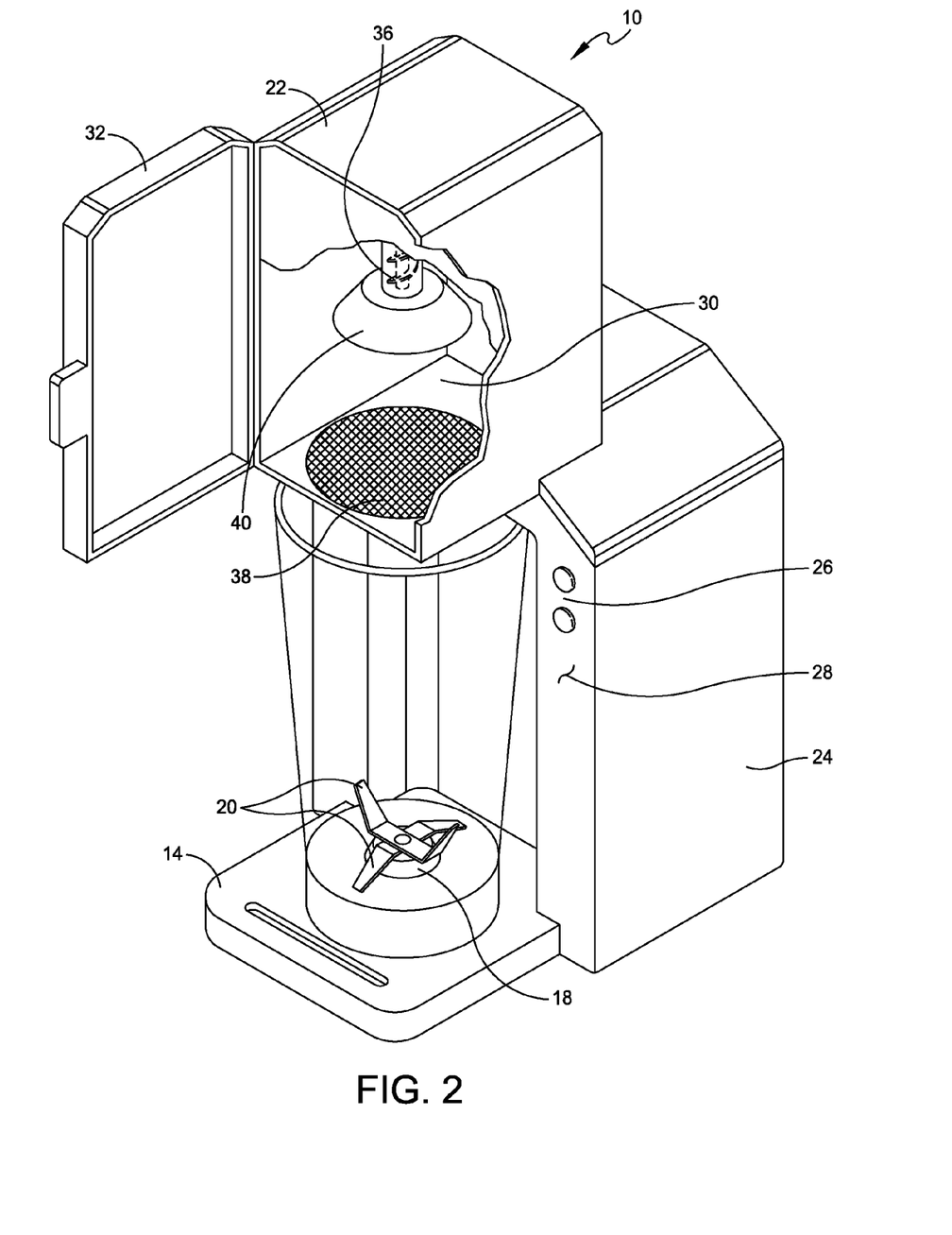
FIG. 2 is a perspective view of the frozen drink dispenser shown in FIG. 1 with a door of a dispensing chamber shown in an open position and part of the dispensing chamber removed to reveal a cartridge receptacle.

Referring to FIG. 2, the dispensing chamber 22 includes a cartridge receptacle 30 and a door 32 that provides access to the cartridge receptacle. The cartridge receptacle 30 is configured and dimensioned to receive a disposable, frozen beverage cartridge 34 (not shown in FIG. 2). The frozen beverage cartridge 34 will be shown and described with reference to FIGS. 3-5. The dispensing chamber 22 further includes a dispense plunger 36 that is controlled by the electronic control panel 26. The dispense plunger 36 drives the downward movement of ingredients contained within the frozen beverage cartridge 34 through a mesh or serrated disc 38 to separate the frozen ingredients being pushed through the disc. The mesh disc 38 may be fabricated from stainless steel material, or any other suitable material, that is capable of separating the frozen material. In an alternative embodiment, the serrated disc could be embedded within a serrated platform under the product to allow more efficient and timely blending.

Figure 3:
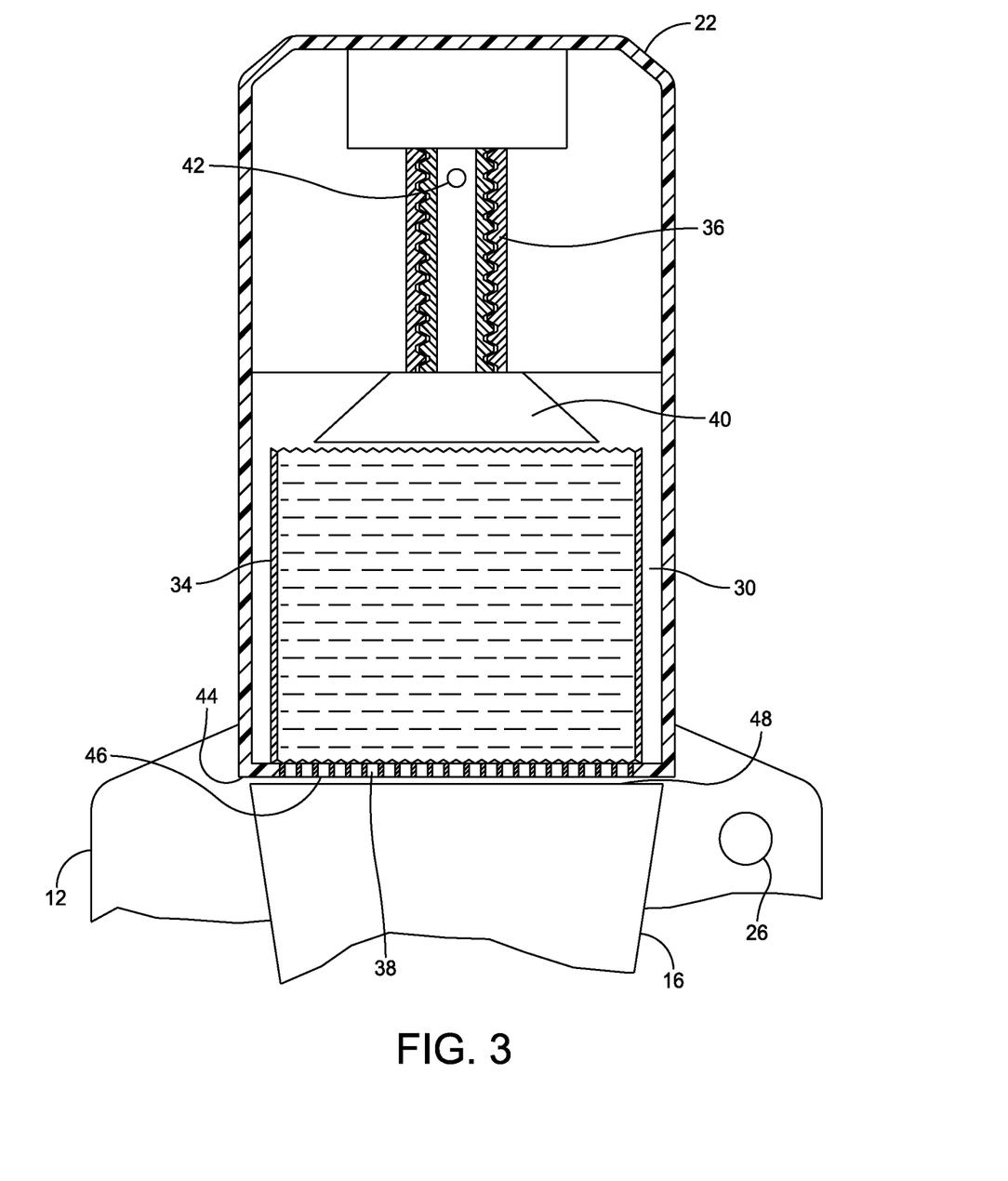
FIG. 3 is a cross-sectional view of the dispensing chamber of the frozen drink dispenser with a dispense plunger of the dispensing chamber being shown in a pre-dispense or upper position.
Figure 4:
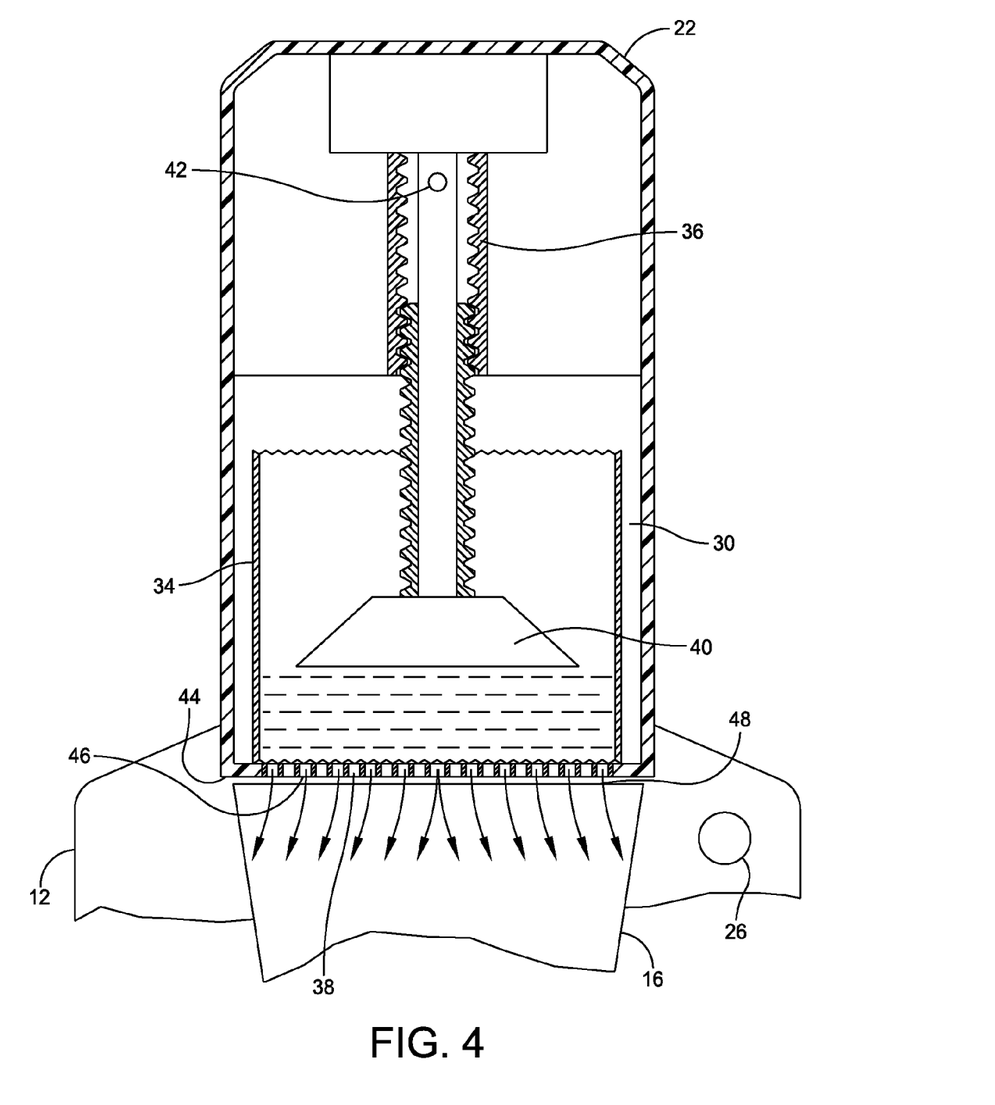
FIG. 4 is a cross-sectional view of the dispensing chamber of the frozen drink dispenser with the dispense plunger being shown in a dispense or lower position.
Figure 5:
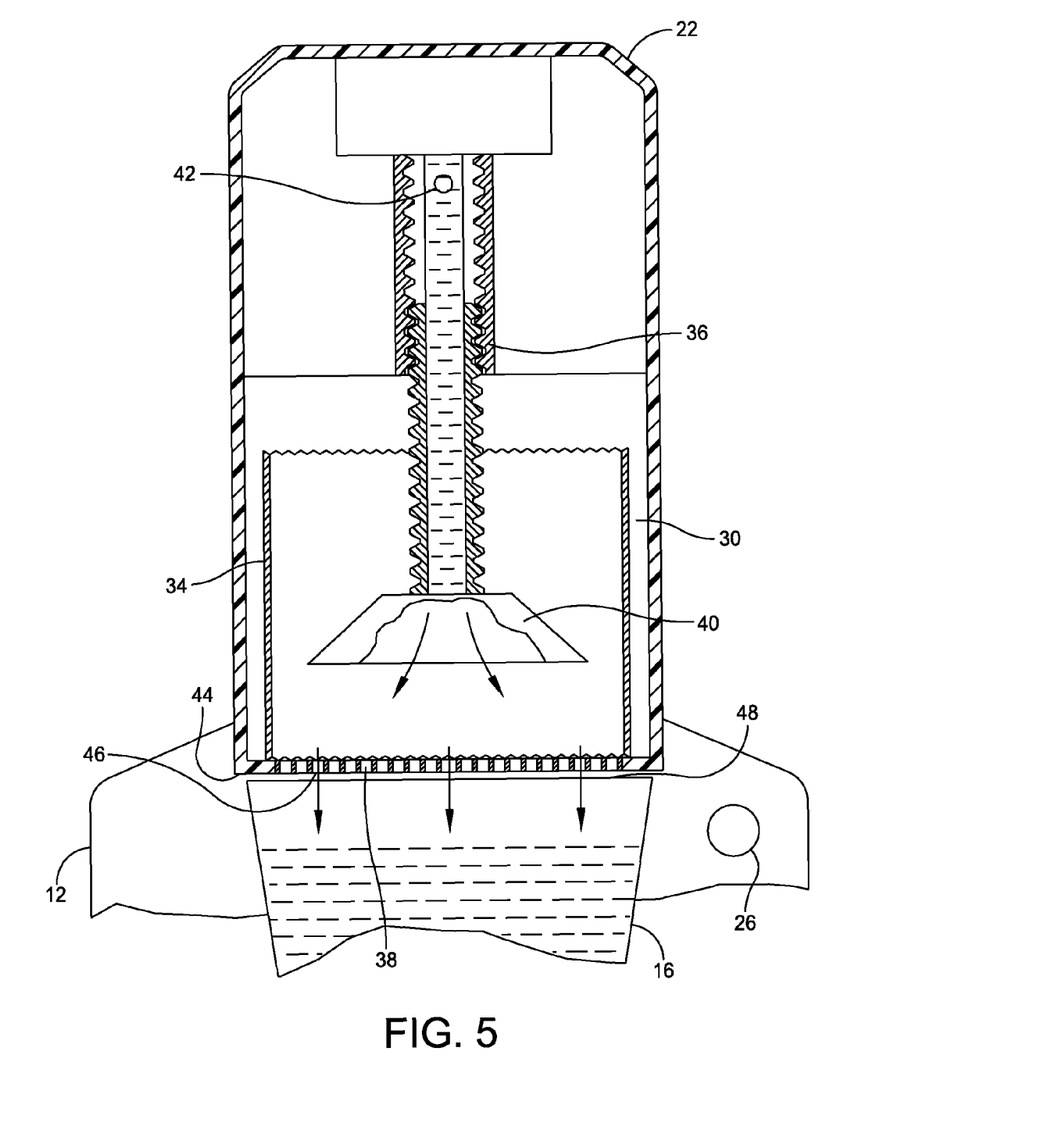
FIG. 5 is a cross-sectional view similar to FIG. 4 showing a fluid (e.g., water) being dispensed through the dispense plunger.

In some embodiments, the frozen beverage cartridge 34 includes an impermeable container fabricated from cardboard or plastic material to contain frozen edible ingredients. In one embodiment, the frozen beverage cartridge 34 is cylindrical in shape. However, other suitable shapes that correspond to the shape of the dispense plunger 36. The frozen beverage cartridge 34 contains ingredients in liquid or non-frozen condition that are placed in a freezer for cooling. As used herein, a "cartridge" may take any suitable form depending on the size and form factor of the dispenser 10. The frozen beverage cartridge 34 may be impervious to air and/or liquid. The frozen beverage cartridge 34 may include edible frozen ingredients, such as fruit, milk, a drink mix, and/or any other suitable ingredient for creating a frozen beverage, such as a smoothie or the like. In preparing a frozen drink, such as a smoothie, the process of preparing a beverage may include infusion, mixing, dissolving or otherwise forming a drinkable substance using water or other beverage precursor (e.g., flavored or otherwise treated water, or other liquid) with the edible ingredient contained within the frozen beverage cartridge. Also, reference to "water" herein is to any suitable water formulation, e.g., filtered, de-ionized, softened, etc., as well as any other suitable precursor liquid used to form a frozen beverage, such as sweetened or flavored water, milk, etc.

Referring to FIGS. 3-5, the dispensing chamber 22, in addition to the dispense plunger 36, includes a cover 40 that is disposed over the dispense plunger to prevent the ingredients from exiting up through the frozen beverage cartridge 34 as the dispense plunger moves downward through the frozen beverage cartridge. The cover 40 assists in maintaining the cartridge receptacle 30 in a sanitized condition while operating the dispense plunger 36. The dispensing chamber 22 further includes a water inlet 42 for introducing measured pumped water into the dispense plunger 36 from the water reservoir 24. Thus, the water is introduced into the blender cup 16 via the dispense plunger 36. The water is used to prepare the frozen beverage and to rinse the dispense plunger 36 and the disc 38.

Referring to FIG. 3, the dispense plunger 36 is shown in a pre-dispense or upper position. In this position, the frozen beverage cartridge 34 may be inserted into the cartridge receptacle 30 with the dispense plunger and the cover 40 disposed above the frozen beverage cartridge.

Referring to FIG. 4, the dispense plunger 36 is shown in a dispense or substantially lower position. In this position, the dispense plunger 36 is moved into the frozen beverage cartridge 34 to push the ingredients contained within the frozen beverage cartridge through the disc 38 and into the blender cup 16.

Referring to FIG. 5, the dispense plunger 36 is further shown in the dispense position with water or another suitable fluid being dispensed through the dispense plunger from the water inlet 42 through the disc 38 and into the blender cup 16. Once the blender cup 16 is filled with the edible ingredients and water, the blender drive 18 is operated to rotate the blades 20 provided in the blender cup. This operation mixes the ingredients within the blender cup 16 to create the finished drink, e.g., the smoothie. As shown, a bottom edge 44 of the dispensing chamber 22 and a bottom surface 46 of the disc 38 are closely proximate to a top edge 48 of the blender cup 16 to prevent the ingredients and water from splashing out of the blender cup.

Figure 6:
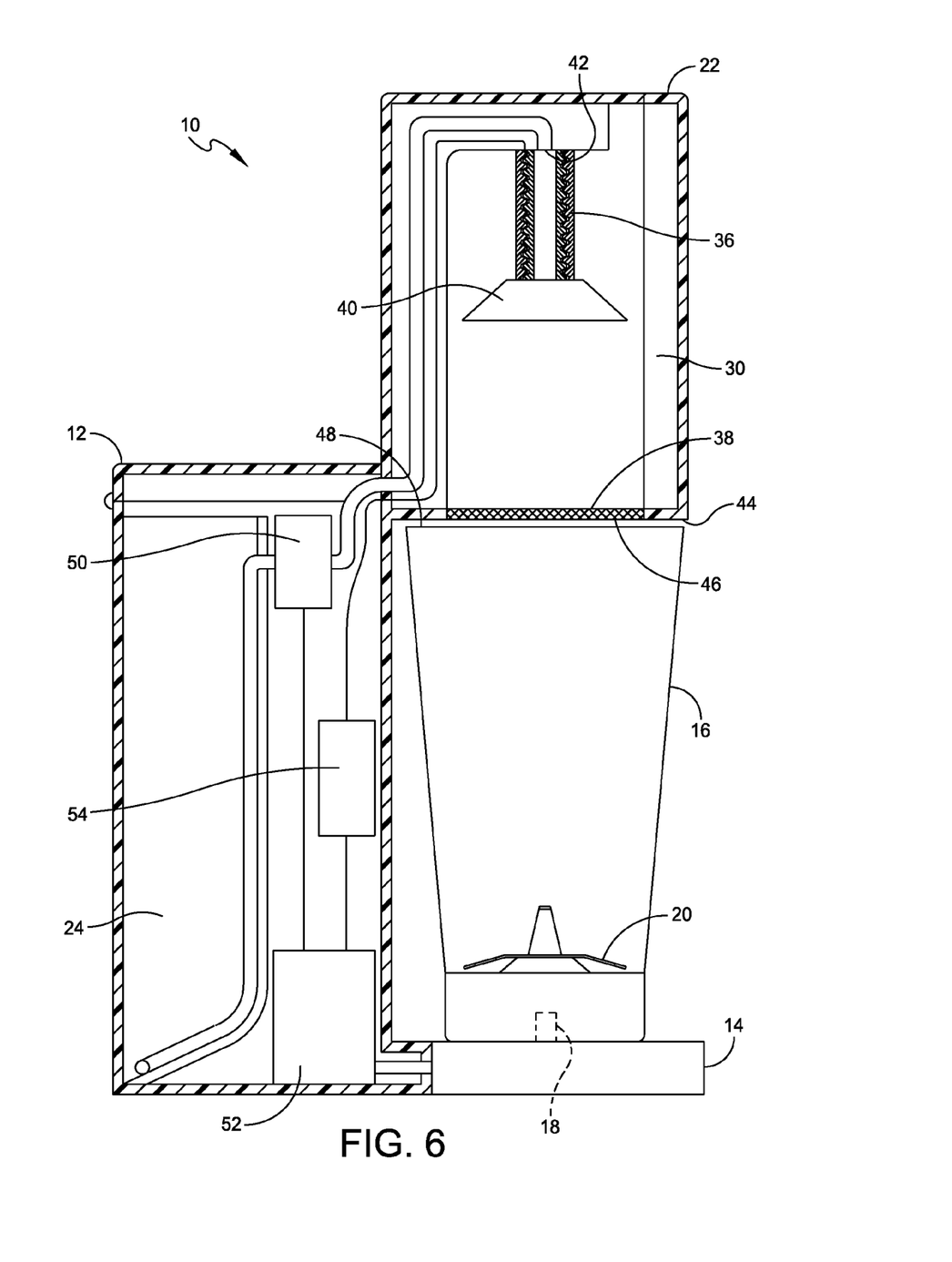
FIG. 6 is a cross-sectional side view of the frozen drink dispenser.

FIG. 6 illustrates other components of the dispenser 10. As shown, the water reservoir 24 is connected to a water pump 50, which drives the movement of the water from the water reservoir to the dispense plunger 36. The dispenser 10 further includes an electronic control box or controller 52 that is coupled to the water pump 50, the blender drive 18, and to the electronic control panel 26. The electronic control box 52 is further coupled to a drive motor 54 to drive the up-and-down movement of the dispense plunger 36, and to the blender drive 18 to rotate the blades 20 of the blender cup. The electronic control box 52, via the electronic control panel 26, controls the operation of these component parts of the dispenser 10.

In light of the foregoing, it will now be understood that the dispenser 10 of the present disclosure is capable of preparing an individual frozen drink from a disposable frozen beverage cartridge 34 containing the necessary ingredients for preparing the frozen drink. In operation, the door 32 of the dispensing chamber 22 is opened and a new frozen cartridge 34 is inserted into the cartridge receptacle 30. Once inserted, the door 32 is closed and the dispense plunger 36 is driven downwardly to expel the frozen ingredients from the frozen beverage cartridge 34 through the disc 38 and into the blender cup 16. Once fully expelled, a pre-measured amount of water is delivered to the blender cup 16 from the water reservoir 24 by operating the water pump 50. This part of the process also rinses the dispense plunger 36 and the disc 38 so as to maintain a clean environment. Once the frozen ingredients and the water are disposed in the blender cup 16, the blender drive 18 is operated to rotate the blades 20. This action blends or mixes the frozen ingredients and the water to create the frozen drink that is suitable for consumption. Once the frozen drink is prepared, the door 32 to the dispensing chamber 22 may be opened to remove the depleted cartridge 34. At this point the process of preparing another frozen beverage may begin again.

A method of dispensing a frozen drink can be achieved by using the dispenser 10 of embodiments of the present disclosure. For example, the method may include inserting a frozen beverage cartridge 34 into the cartridge receptacle 30 of the individual frozen drink dispenser 10. Next, the contents of the frozen beverage cartridge 34 are pushed through the meshed or serrated disc 38 positioned at a bottom of the cartridge receptacle 30. Next, the contents of the frozen beverage cartridge 34 are dispensed from the meshed or serrated disc 38 into the blender cup 16. Next, the contents of the frozen beverage cartridge dispensed in the blender cup 16 are blended with blades 20 provided in the blender cup. Optionally, when pushing the contents of the frozen beverage cartridge 34 through the meshed or serrated disc 38, the method further may include injecting fluid from the water reservoir 24 into the cartridge receptacle 30 when pushing contents of the frozen cartridge to add flavor, for example, to the contents being pushed through the meshed or serrated disc.

Figure 7:
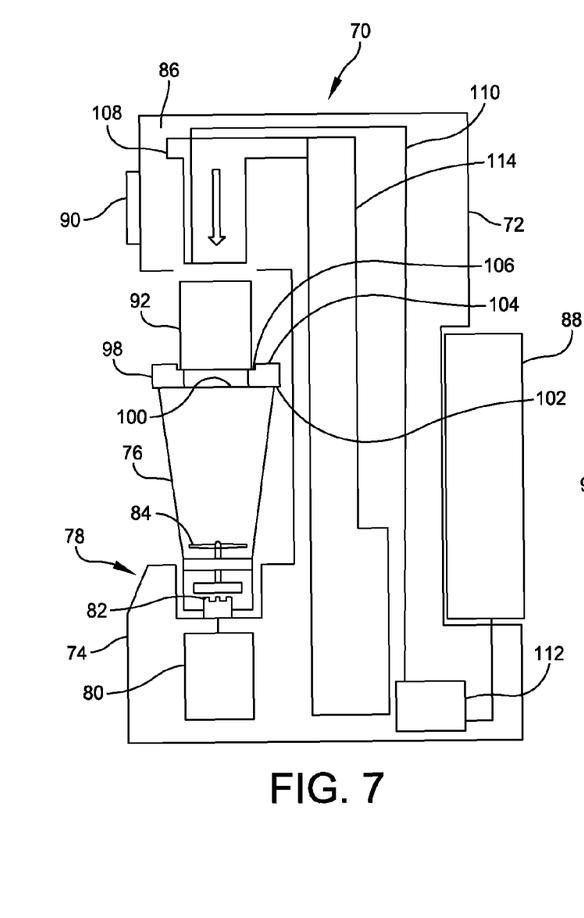
FIG. 7 is a schematic view of an individual frozen drink dispenser of another embodiment of the present disclosure in a pre-dispense position.

Referring to FIG. 7, another embodiment of an individual frozen drink dispenser of the present disclosure is generally indicated at 70. As shown, the dispenser 70 includes a housing 72 with a forwardly protruding base 74 configured to support a blender cup 76 for the dispensed frozen beverage. The dispenser 70 further includes a blender assembly generally indicated at 78 having a motor 80 provided within the base 74 to power the operation of a drive mechanism 82 associated with the blender cup 76. As shown, the drive mechanism 82 is coupled to blades 84 provided within the blender cup 76 to chop or otherwise blend the material deposited in the blender cup. The housing 72 further includes an upper chamber 86 positioned above the base 74. The housing 72 further includes a water reservoir 88 positioned at a rear of the housing and an electronic control panel 90 provided on a front surface of the housing to control the operation of the dispenser 70. In one embodiment, the control panel 90 functions as a user interface designed to manipulate a controller, which control the operative components of the dispenser 70.

Figure 8:
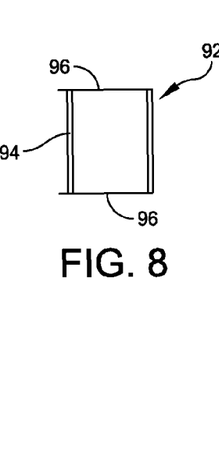
FIG. 8 is a schematic view of a frozen product pod that is used with the individual frozen drink dispenser shown in FIG. 7.

Referring to FIG. 8, a frozen product pod or cartridge is generally indicated at 92. As shown, the pod 92 includes a generally cylindrical packaging tube 94 and two peel-away seals, each indicated at 96, provided at open ends of the tube. The arrangement is such that product for dispensing is disposed within the tube 94 and held in place by the seals 96. During use, the seals 96 are removed by pealing them away from the tube 94, and the pod is utilized to dispense the frozen product contained within the tube of the pod into the blender cup 76. In some embodiments, the tube 94 of the pod 92 includes an impermeable container fabricated from cardboard or plastic material to contain frozen edible ingredients. In other embodiments, the seals 96 of the pod 92 include foil or some other material suitable for containing the product within the tube 94 of the pod and for peeling away from the tube when it is desired to use the pod. Although the tube 94 of the pod 92 is shown to be cylindrical in shape, other suitable shapes may be provided that are tailored to the shapes of devices that are used to move the product out of the tube.

In one embodiment, the pod 92 contains ingredients in liquid or non-frozen condition that are placed in a freezer for cooling. As used herein, a "pod" may take any suitable form depending on the size and form factor of the dispenser 70. The pod 92 may be impervious to air and/or liquid. As with cartridge 34, the pod 92 may include edible frozen ingredients, such as fruit, milk, a drink mix, and/or any other suitable ingredient for creating a frozen beverage, such as a smoothie or the like. In preparing a frozen drink, such as a smoothie, the process of preparing a beverage may include infusion, mixing, dissolving or otherwise forming a drinkable substance using water or other beverage precursor (e.g., flavored or otherwise treated water, or other liquid, such as milk) with the edible ingredient contained within the pod 92.

Referring back to FIG. 7, in one embodiment, a pod support 98 is positioned on a top lip or edge 100 of the blender cup 76. As shown, the pod support 98 includes a lower surface 102 configured to seat the pod support on the edge 100 of the blender cup 76 and an upper surface 104 having a recess 106 formed therein, the recess being sized to receive the pod 92 within the recess after removing the seals 96 from the tube 94 of the pod. In another embodiment, the pod support 98 may be supported by the housing 72 below the chamber 86. The dispenser 70 further includes a dispense plunger 108 within the chamber 86, with the dispense plunger being controlled by an operator via the electronic control panel 90. The dispense plunger 108 drives the downward movement of ingredients contained within the tube 94 of the pod 92 into the blender cup 76. The dispenser 70 further includes a water line 110 for introducing measured pumped water into the dispense plunger 108 from the water reservoir 88. A pump 112 is provided within the housing 72 of the dispenser 70 to move the water from the reservoir 88 through the water line 110. In one embodiment, the pump 112 is also controlled by the controller associated with the electronic control panel 90. The water line 110 is provided to introduce water into the blender cup 76 via the dispense plunger 108. The water is used to prepare the frozen beverage. FIG. 7 illustrates the dispense plunger 108 of the dispenser 70 in a pre-dispense or upper position. In this position, the pod 92 with seals 96 removed from the tube 94 may be placed on the pod support 98 with the dispense plunger 108 disposed above the pod.

Figure 9:
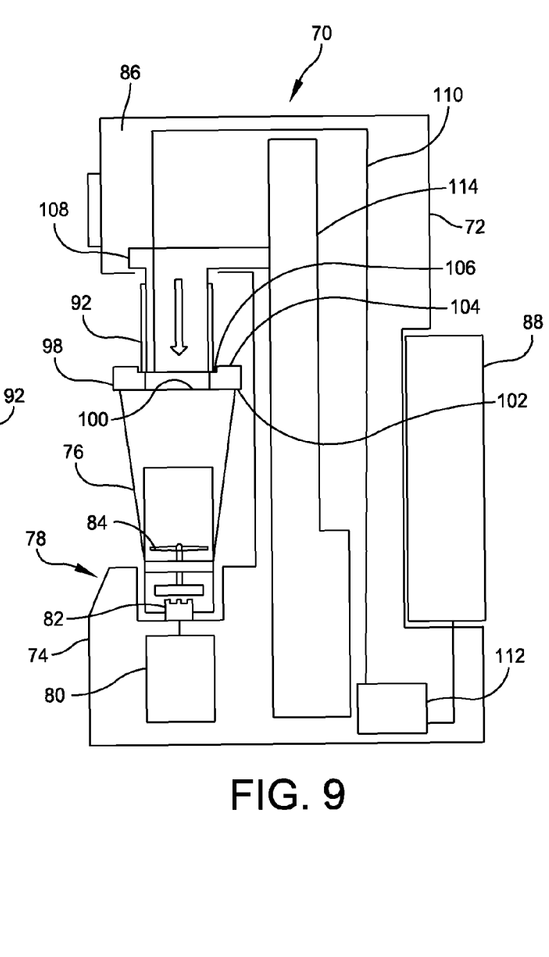
FIG. 9 is a schematic view of the individual frozen drink dispenser of FIG. 7 in a dispense position.

FIG. 9 illustrates the dispense plunger 108 of the dispenser 70 in a dispense or lower position. As shown, the dispenser 70 includes a plunger drive mechanism 114 that is coupled to the dispense plunger 108 to drive the up-and-down movement of the dispense plunger within the chamber 86. In one embodiment, the plunger drive mechanism 114 operates under the control of the controller associated with the control panel 90. In the dispense position, the dispense plunger 108 is moved into the tube 94 of the pod 92 to push the ingredients contained within the pod into the blender cup 76. As shown, the dispense plunger 108 is sized to tightly fit within the tube 94 of the pod 92 so that when moving the dispense plunger downwardly with the plunger drive mechanism 114, the dispense plunger moves all or nearly all of the ingredients contained within the pod out of the pod and into the blender cup 76. Once dispensed, the dispense plunger 108 returns to its upper, pre-dispense position. Water is then introduced into the blender cup 76 by operating the pump 112 and the motor 80 drives the rotation of the blades 84 via the drive mechanism 82 to blend the ingredients to prepare the frozen drink.

Once blended, the cycle is complete and the blender cup 76 may be removed from the base 74 of the dispenser 70 and the pod 92 is removed from the pod support 98. Next, the pod support 98 is removed from the upper edge 100 of the blender cup 76 in which the frozen drink contained within the blender cup is ready to drink.

Figure 10:
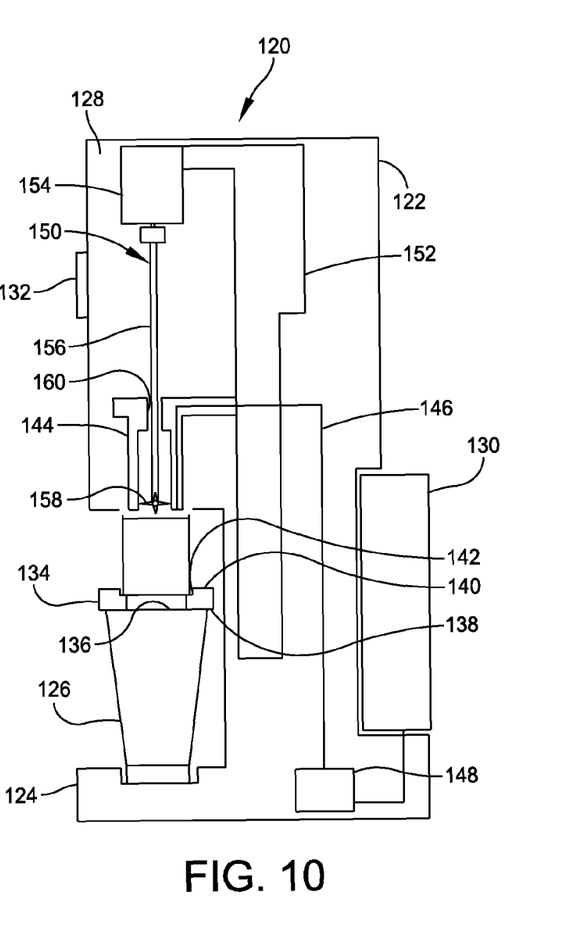
FIG. 10 is a schematic view of an individual frozen drink dispenser of yet another embodiment of the present disclosure in a pre-dispense position.

Referring now to FIG. 10, another embodiment of an individual frozen drink dispenser of the present disclosure is generally indicated at 120. As shown, the dispenser 120 includes a housing 122 with a forwardly protruding base 124 configured to support a blender cup 126 for the dispensed frozen beverage. Unlike blender cup 76, the blender cup 126 does not include a drive mechanism or blades incorporated within the blender cup, but instead includes a flat bottom. The housing 122 further includes an upper chamber 128 positioned above the base 124. The housing 122 further includes a water reservoir 130 positioned at the rear of the housing and an electronic control panel 132 provided on a front surface of the housing to control the operation of the dispenser. In one embodiment, the control panel 132 functions as a user interface designed to manipulate a controller associated with the control panel, which controls the operative components of the dispenser 120.

A pod support 134 is positioned on a top lip or edge 136 of the blender cup 126. As shown, the pod support 134 includes a lower surface 138 configured to seat the pod support on the edge 136 of the blender cup 126 and an upper surface 140 having a recess 142 formed therein, the recess being sized to receive the pod 92 within the recess after removing the seals 96 from the tube 94 of the pod. The dispenser 120 further includes a dispense plunger 144 positioned within the chamber 128, the dispense plunger being controlled by an operator via the electronic control panel 132. The dispense plunger 144 drives the downward movement of ingredients contained within the tube 94 of the pod 92 into the blender cup 126. The dispenser 120 further includes a water line 146 for introducing measured pumped water into the dispense plunger 144 from the water reservoir 130. A pump 148 is provided within the housing 122 of the dispenser 120 to move the water from the reservoir 130 through the water line 146. In one embodiment, the pump 148 is also controlled by the controller associated with the electronic control panel 132. As with dispenser 70, the water line 146 of dispenser 120 is provided to introduce water into the blender cup 126 via the dispense plunger 144. FIG. 10 illustrates the dispense plunger 144 of the dispenser 120 in a pre-dispense or upper position. In this position, the pod 92 may be placed on the pod support 134 with the dispense plunger 144 disposed above the pod.

The dispenser 120 further includes a blender assembly generally indicated at 150 mounted on a plunger and blender drive mechanism 152 on which the dispense plunger 144 is also mounted. As shown, the blender assembly 150 includes a motor 154 supported by the plunger and blender drive mechanism 152 at an upper end of the plunger and blender drive mechanism. The blender assembly 150 further includes a rotatable shaft 156 connected to the motor 154 at an upper end of the shaft and blades 158 mounted on the shaft at a lower end of the shaft. The shaft 156 of the blender assembly extends through an opening 160 formed in the dispense plunger 144, with the shaft being lowered into the blender cup 126 to chop or otherwise blend the ingredients contained within the blender cup.

Figure 11:
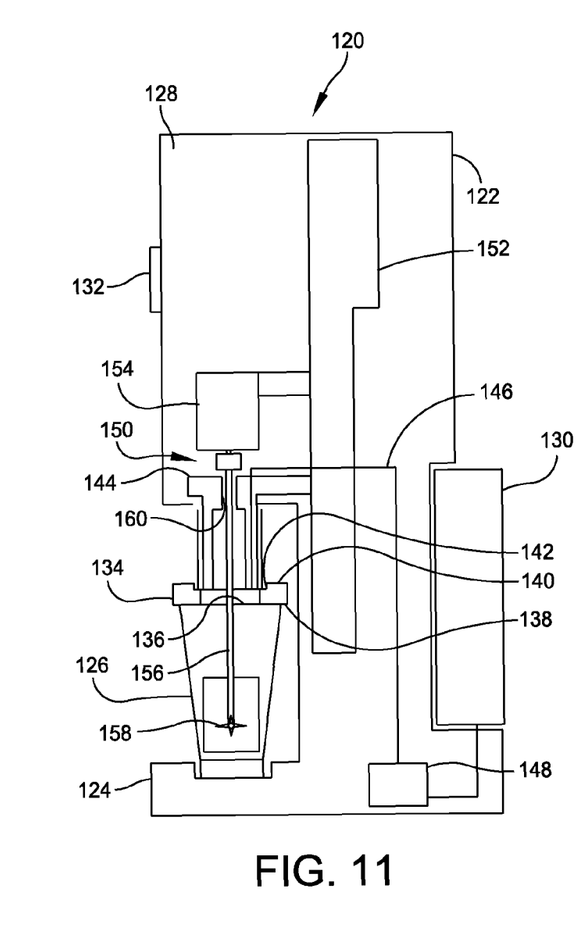
FIG. 11 is a schematic view of the individual frozen drink dispenser of FIG. 10 in a dispense position.

FIG. 11 illustrates the dispense plunger 144 of the dispenser 120 in a dispense or lower position. As shown, the dispense plunger 144 is coupled to the plunger and blender drive mechanism 152 to drive the up-and-down movement of the dispense plunger as well. In the dispense position, the dispense plunger 144 is moved into the pod 92 to push the ingredients contained within the pod into the blender cup 76. Once dispensed, the dispense plunger 144 returns to its upper, pre-dispense position. Water is then introduced into the blender cup 126 by the water line 146, and the blades 158 of the blender assembly 150 are lowered into the blender cup. The motor 154 drives the rotation of the blades 158 to blend the frozen drink. Once blended, the dispense plunger 144 and the blender assembly 150 are returned to their home or upper position. It should be noted that the movement of the dispense plunger 144 and the blender assembly 150 by the plunger and drive mechanism 152 may occur independently or simultaneously depending on how the mechanism is configured.

When the cycle is complete, the blender cup 126 may be removed from the base of the dispenser 120 and the pod 92 is removed from the pod support 134. Next, the pod support 134 is removed from the upper edge 136 of the blender cup 126 in which the frozen drink contained within the blender cup is ready to drink.

It should be understood that while the plunger drive mechanisms 114, 152 of the dispensers 70, 120 are shown to be automated under the control of the controller associated with control panels 90, 132, respectively, the plunger drive mechanisms can be manually operated by the person operating the dispensers. For example, a lever or some other manually operated device may be associated with the plunger drive mechanism 114, 152 to move the dispense plungers 108, 114 upward and downward to dispense the product contained within the pods 92.

Having thus described at least one embodiment of the present disclosure, various alternations, modifications and improvements will readily occur to those skilled in the art. Such alterations, modifications and improvements are intended to be within the scope and spirit of the disclosure. Accordingly, the foregoing description is by way of example only and is not intended to be limiting. The disclosure's limit is defined only in the following claims and equivalents thereto.

What is claimed is:

1. An individual frozen drink dispenser comprising:
a housing having a base configured to support a blender cup, wherein the blender cup is provided with rotatable blades;
a package support disposed above the blender cup and configured to support a package containing frozen ingredients suitable for preparing a frozen drink;
a dispense mechanism coupled to the housing and configured to move from a pre-dispense position to a dispense position, wherein the dispense mechanism pushes the frozen ingredients from the package into the blender cup; and
a drive mechanism coupled to the housing and configured to rotate the rotatable blades to blend the frozen ingredients in the blender cup.

2. The individual frozen drink dispenser of claim 1, further comprising a water reservoir provided within the housing and a water line in fluid communication with the water reservoir and an opening of the blender cup.

3. The individual frozen drink dispenser of claim 2, further comprising a water pump in fluid communication with the water line, wherein the water pump is configured to drive the movement of water from the water reservoir to the dispense mechanism and into the blender cup.

4. The individual frozen drink dispenser of claim 1, further comprising a blender assembly configured to blend ingredients within the blender cup.

5. The individual frozen drink dispenser of claim 4, wherein the blender assembly includes a motor disposed within the base, wherein the motor is configured to power the operation of the drive mechanism.

6. The individual frozen drink dispenser of claim 1, wherein the package support is configured to rest on the blender cup.

7. The individual frozen drink dispenser of claim 6, wherein the package support includes a lower surface configured to seat the package support on an upper edge of the blender cup and an upper surface having a recess formed therein, the recess being sized to receive the package within the recess after removing a seal from the package.

8. The individual frozen drink dispenser of claim 1, further comprising a controller coupled to the drive mechanism and configured to control the operation of the individual frozen drink dispenser.

9. A method of dispensing a frozen drink, the method comprising:
placing a blender cup on a base of an individual frozen drink dispenser;
placing a package on package support disposed above the blender cup, the package containing frozen ingredients suitable for preparing a frozen drink;
pushing the frozen ingredients of the package into the blender cup; and
blending the frozen ingredients in the blender cup,
wherein blending the frozen ingredients is achieved by using a blade assembly coupled to the blender cup.

10. The method of claim 9, wherein the blade assembly is coupled to a motor drive.

11. The method of claim 9, further comprising injecting fluid from a water reservoir into the blender cup.

12. The method of claim 9, further comprising removing the blender cup from the base of the dispenser.

13. The method of claim 12, further comprising removing the package support from an upper edge of the blender cup.

14. The method of claim 13, wherein pushing the ingredients of the package into the blender cup is achieved by a dispense mechanism.

15. The method of claim 14, wherein the dispense mechanism is coupled to a drive mechanism of the dispenser.

16. An individual frozen drink dispenser comprising:
a housing having a base configured to support a blender cup;
a package support disposed above the blender cup and configured to support a package containing frozen ingredients suitable for preparing a frozen drink;

a dispense mechanism coupled to the housing and configured to move from a pre-dispense position to a dispense position in which the dispense mechanism pushes the frozen ingredients from the package into the blender cup; and a blender assembly comprising a rotatable shaft connected at one end thereof to a motor and blades mounted on the shaft at an opposite end of the shaft, wherein the rotatable shaft extends through the dispense mechanism to blend ingredients contained within the blender cup.

17. The individual frozen drink dispenser of claim 16, wherein the package support is configured to rest on the blender cup.

18. The individual frozen drink dispenser of claim 16, wherein the package support includes a lower surface configured to seat the package support on an upper edge of the blender cup and an upper surface having a recess formed therein, the recess being sized to receive the package within the recess after removing a seal from the package.

19. A method of dispensing a frozen drink, the method comprising:

placing a blender cup on a base of an individual frozen drink dispenser;

placing a package on a package support disposed above the blender cup, the package containing frozen ingredients suitable for preparing a frozen drink;

pushing the frozen ingredients of the package into the blender cup using a dispense mechanism coupled to the housing and configured to move from a pre-dispense position to a dispense position; and blending the frozen ingredients in the blender cup;

wherein the step of blending the frozen ingredients is achieved using a blender assembly comprising a rotatable shaft connected at one end thereof to a motor and blades mounted on the shaft at an opposite end of the shaft, wherein the rotatable shaft extends through the dispense mechanism to blend ingredients contained within the blender cup.

* * * * *